(12) United States Patent
Matsushima

(10) Patent No.: US 7,751,004 B2
(45) Date of Patent: Jul. 6, 2010

(54) LIQUID CRYSTAL DISPLAY DEVICE AND ELECTRONIC APPARATUS

(75) Inventor: Toshiharu Matsushima, Azumino (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 116 days.

(21) Appl. No.: 12/107,210

(22) Filed: Apr. 22, 2008

(65) Prior Publication Data

US 2008/0273152 A1    Nov. 6, 2008

(30) Foreign Application Priority Data

May 1, 2007    (JP) .............................. 2007-120549

(51) Int. Cl.
*G02F 1/1335* (2006.01)
(52) U.S. Cl. ..................................... 349/117
(58) Field of Classification Search ................... 349/117
See application file for complete search history.

(56) References Cited

U.S. PATENT DOCUMENTS

2004/0252258 A1    12/2004    Matsushima
2006/0158590 A1    7/2006    Matsushima
2007/0013773 A1    1/2007    Tsuchiya et al.
2008/0106676 A1    5/2008    Itou et al.

FOREIGN PATENT DOCUMENTS

| JP | A 2005-338256 | 12/2005 |
|---|---|---|
| JP | A 2006-276871 | 10/2006 |
| JP | A-2006-292847 | 10/2006 |
| JP | A 2007-047732 | 2/2007 |
| JP | A-2008-116731 | 5/2008 |
| WO | WO2005/114312 | * 12/2005 |

* cited by examiner

*Primary Examiner*—Jerry T Rahll
(74) *Attorney, Agent, or Firm*—K&L Gates LLP

(57) ABSTRACT

In a transflective type liquid crystal display device of an FFS system, a plurality of pixels has a transmissive display area for emitting transmissive display light and a reflective display area for emitting reflective display light, and the reflective display area is equipped with a retardation layer. Polarization axes of polarizers are perpendicular to each other and an alignment direction of the liquid crystal layer is parallel to or perpendicular to the polarization axis of the first polarizer. The angle of a slow axis of the retardation layer is not less than 20° and not more than 25° or not less than 60° and not more than 75° with respect to the polarization axis of the first polarizer. A retardation value of the liquid crystal layer in the reflective area exceeds a quarter wavelength, and a retardation value of the retardation layer exceeds a half wavelength.

4 Claims, 6 Drawing Sheets

LIQUID CRYSTAL DISPLAY DEVICE AND ELECTRONIC APPARATUS

The entire disclosure of Japanese Patent Application No. 2007-120549, filed May 1, 2007 is expressly incorporated by reference herein.

BACKGROUND

1. Technical Field

The present invention relates to a liquid crystal display device for driving liquid crystal by a horizontal electric field and an electronic apparatus equipped with the same. In particular, the present invention relates to a liquid crystal display device of a transflective type in which a transmissive area and a reflective area are provided in each of a plurality of pixels and a retardation layer is formed in the reflective area.

2. Related Art

In order to provide a wide viewing area in a liquid crystal display device, a liquid crystal display device of a type in which liquid crystal is driven by a horizontal electric field by so called a fringe field switching (hereinafter, referred to as FFS) system, an in plane switching (hereinafter, referred to as IPS) system, and the like have been put into practical use. Further, in such a type of liquid crystal display device, a transflective type liquid crystal display device in which a transmissive area and a reflective area are provided in each of a plurality of pixels have been proposed.

Further, under the assumption that to minimize the influence of viewing angle dependence property of the retardation film, it has been proposed to employ the structures described below in order to solve a difference of the retardation value caused by a difference of the length of the pathway through which light is transmitted in a transmissive mode and a reflective mode (see JP-A-2005-338256 (hereinafter, referred to as Patent Document 1)).

(a) provide a retardation layer in a reflective area;

(b) dispose a first polarizer and a second polarizer so that the polarization axes thereof are perpendicular to each other;

(c) the alignment direction of liquid crystal is parallel to the polarization axis of the first polarizer;

(d) the angle made by the slow axis of the retardation layer and the polarization axis of the first polarizer is about 22.5°;

(e) the retardation value of a liquid crystal layer in the reflective area is a quarter wavelength; and (f) the retardation value of the retardation layer is a half wavelength.

That is, the structures are employed in which the retardation layer is provided only in the reflective area under the condition that the display is not disturbed in the transmissive mode, the polarization axis of the polarizer and the alignment direction of liquid crystal are set so as to be parallel to or perpendicular to each other, and the retardation of the liquid crystal layer in the reflective area is set to a quarter wavelength and the retardation of the retardation layer is set to a half wavelength.

In such conditions, in order to perform black display in the reflective area, if the angle between the polarization axis of the polarizer and the slow axis of the retardation layer is α and the angle between the polarization axis of the polarizer and the alignment direction of liquid crystal (alignment axis of liquid crystal) is β, it is required to basically satisfy the following formula.

$$\beta = \alpha \times 2 \pm 45°$$

Further, if consider the above described structure, as β becomes 0° (or 180°), α inevitably becomes 22.5° (or about 67.5°).

However, in the structures (a) to (f) disclosed in Patent Document 1, as is regulated by the structures of (e) and (f), if the retardation value of the liquid crystal layer in the reflective area with respect to the light whose wavelength is 550 nm is set to the quarter wavelength, when Δn of the liquid crystal layer is about 0.12, the thickness of the liquid crystal layer have to be set to an extremely thin thickness of about 1.1 μm. As a result, there is a problem in that it is difficult to provide mass production.

SUMMARY

An advantage of some aspects of the invention is to provide a liquid crystal display device capable of preferably displaying black in a reflective area even when the thickness of a liquid crystal layer is increased in view of mass productivity, and an electronic apparatus equipped with the same.

According to an aspect of the invention, there is provided a liquid crystal display device that includes a first substrate from which display light is emitted, a second substrate bonded together with the first substrate via a seal material, a liquid crystal layer homogeneously aligned between the first substrate and the second substrate, a pixel electrode provided on the second substrate, a common electrode provided on the second substrate, the common electrode applying an electric field to the liquid crystal layer with the pixel electrode, a pixel including the pixel electrode and the common electrode, the pixel having a transmissive display area and a reflective display area, a first polarizer provided on the first substrate, the first polarizer having a polarization axis parallel to or perpendicular to an initial alignment direction of the liquid crystal layer, a second polarizer provided on the second substrate, the second polarizer having a polarization axis perpendicular to the polarization axis of the first polarizer, and a retardation layer formed between the liquid crystal layer and the first polarizer in the reflective display area, the retardation layer having a slow axis that makes an angle of not less than 20° and not more than 25° or not less than 60° and not more than 75° with respect to the polarization axis of the first polarizer. A retardation value of the liquid crystal layer in the reflective display area is set to a value that exceeds a quarter wavelength, and a retardation value of the retardation layer is set to a value that exceeds a half wavelength.

A range of the retardation value of the retardation layer at which achromatic dark display can be obtained in the reflective display area when no voltage is applied even when the retardation value of the liquid crystal layer in the reflective display area is changed is obtained. As a result, in the invention, a new knowledge is obtained that achromatic dark display can be obtained in the reflective display area when no voltage is applied even when the retardation value of the liquid crystal layer in the reflective display area exceeds a quarter wavelength as long as the retardation value of the retardation layer exceeds a half wavelength.

It is preferable that the retardation layer is formed on a surface of the first substrate at the liquid crystal layer side in the aspect of the invention.

It is preferable that if the retardation value of the liquid crystal layer in the reflective area is RLc (nm) and the retardation value of the retardation layer is Rf (nm), RLc and Rf satisfy the following relation: 1.3148×RLc+91.985−15≦Rf≦1.3148×RLc+91.985+15 in the aspect of the invention.

The liquid crystal display device to which the invention is applied may be applied to any of an FFS system and an IPS system. However, in the case of the liquid crystal display device of an FFS system, the common electrode can be formed in a solid manner and there is an advantage in that it is not required to separately form a retention capacity. Consequently, it is preferable to apply the invention to the liquid crystal display device of an FFS system. In this case, an interelectrode insulating film is to be formed between the pixel electrode and the common electrode.

The liquid crystal display device to which the invention is applied is used as a display unit of an electronic apparatus such as a mobile phone, a mobile computer, or the like, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
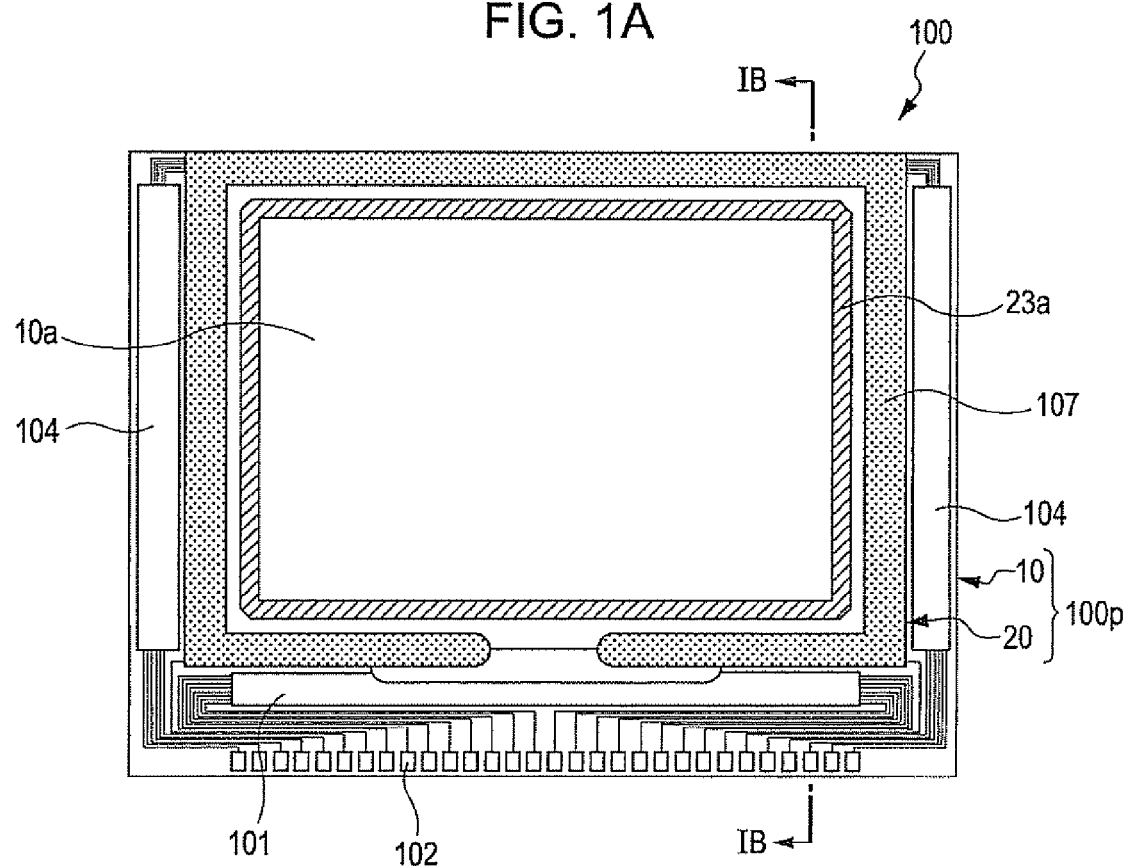
FIG. 1A is a plan view showing a liquid crystal display device to which the present invention is applied with each constituent elements formed thereon viewed from the side of a counter substrate.

Hereinafter, an embodiment of the invention will be described. Note that in the drawings referred in the following description, the scales of each layer and each member are different so that each layer and each member can be recognized in the drawings.

First Embodiment

Entire Structure

Figure 1B:
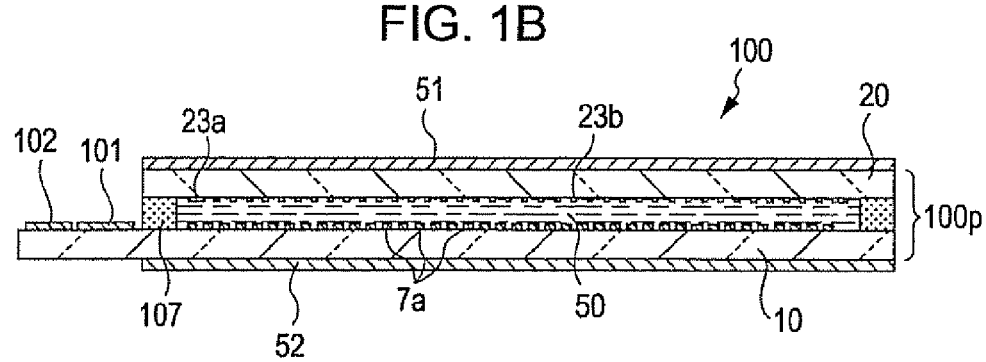
FIG. 1B is a cross sectional view taken along the line IB-IB of FIG. 1A.

FIG. 1A is a plan view showing a liquid crystal display device to which the present invention is applied with each constituent elements formed thereon viewed from the side of a counter substrate, and FIG. 1B is a cross sectional view taken along the line IB-IB of FIG. 1A.

In FIGS. 1A, 1B, a liquid crystal display device 100 of the embodiment is an active matrix liquid crystal display device of a transflective type. A liquid crystal panel 100p is equipped with an element substrate 10, a counter substrate 20 oppositely disposed to the element substrate 10, and a liquid crystal layer 50 homogeneously aligned between the counter substrate 20 and the element substrate 10. A seal material 107 is provided on the element substrate 10 so as to align along the margin of the counter substrate 20 and the counter substrate 20 and the element substrate 10 are bonded together by the seal material 107. On the element substrate 10, a data line driving circuit 101 and mount terminals 102 are provided in the area outside the seal material 107 along one side of the element substrate 10. Scanning line driving circuits 104 are formed along the two sides which are adjacent to the one side at which the mount terminals 102 are arranged. The counter substrate 20 has an outline approximately equal to the seal material 107, and the counter substrate 20 is fixed to the element substrate 10 by the seal material 107. The liquid crystal 50 is held between the element substrate 10 and the counter substrate 20. The liquid crystal layer 50 is a liquid crystal composition showing positive dielectric constant anisotropy in which a dielectric constant in the alignment direction is larger than that in its normal direction. The liquid crystal layer 50 shows a nematic phase in a wide temperature range.

As is described in detail in the following, pixel electrodes 7a are formed on the element substrate 10 in a matrix manner. On the contrary, a light shielding layer 23a having a frame shape made of a light shielding material is formed in the area inside the seal material 107, and the inside area is a viewing area 10a. A light shielding film 23b referred to as a black matrix, a black stripe, or the like is formed on the counter substrate 20 in the area opposing vertical and horizontal pixel border areas of pixel electrodes 7a of the element substrate 10.

The liquid crystal layer 50 is driven by an FFS mode in the liquid crystal display device 100 of the embodiment. Accordingly, a common electrode (not shown in FIG. 1B) described below is also formed on the element substrate 10 in addition to the pixel electrodes 7a, and a counter electrode is not formed on the counter substrate 20. Note that in the liquid crystal display device 100, a first polarizer 51 and a second polarizer 52 are disposed at the sides of each of the element substrate 10 and the counter substrate 20. Further, a back light device (not shown) is disposed at the side of the element substrate 10.

Electrical Structure of Liquid Crystal Display Device 100

Figure 2:
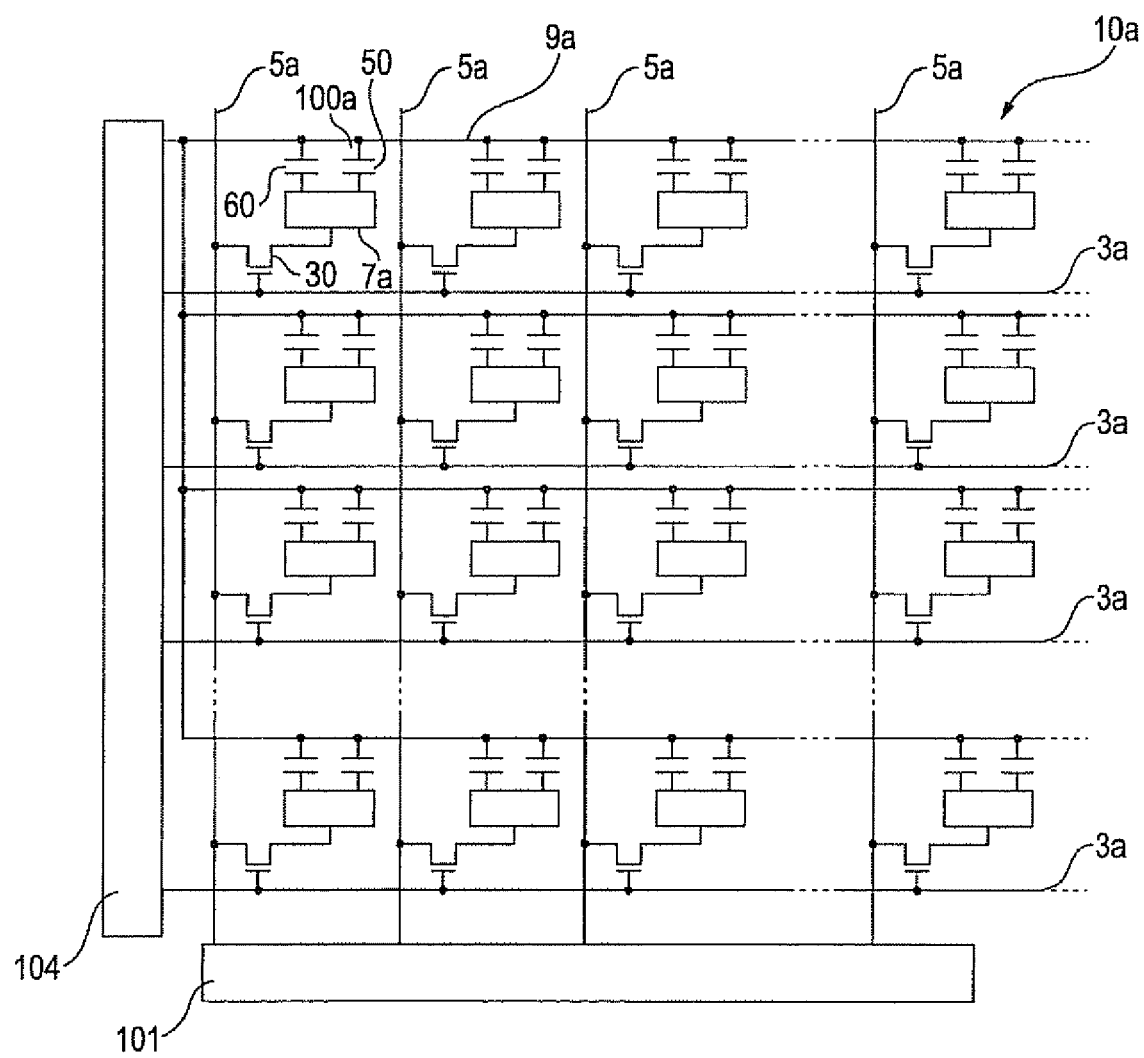
FIG. 2 is an equivalent circuit diagram showing an electrical structure of a viewing area of an element substrate used for the liquid crystal display device to which the invention is applied.

FIG. 2 is an equivalent circuit diagram showing an electrical structure of the viewing area 10a of the element substrate 10 used for the liquid crystal display device 100 to which the invention is applied. As shown in FIG. 2, pluralities of pixels 100a are formed in the viewing area 10a of the liquid crystal display device 100 in a matrix manner. The pixel electrode 7a, a thin film transistor 30 for switching a pixel for controlling the pixel electrode 7a are formed in each of the plurality of the pixels 100a. A data line 5a for line sequentially supplying a data signal is electrically connected to the source of the thin film transistor 30. A scanning line 3a is electrically connected to the gate of the thin film transistor 30. A scanning signal is to be line sequentially applied to the scanning line 3a in a predetermined timing. The pixel electrode 7a is electrically connected to the drain of the thin film transistor 30. The data signal supplied from the data line 5a is written into each pixel 100a at a predetermined timing by setting the thin film transistor 30 to on state for a predetermined period. The pixel signal having a predetermined level written into the liquid crystal layer 50 shown in FIG. 1B via the pixel electrode 7a in this manner is kept for a predetermined period between with a common electrode 9a formed on the element substrate 10. Herein, a retention capacity 60 is formed between the pixel electrode 7a and the common electrode 9a. Accordingly, the voltage of the pixel electrode 7a is kept for a time longer than the multiple of three digit of the time during the source voltage is applied. Herewith, the retention property of the electric charge is improved, and the liquid crystal display device 100 capable of displaying with a high contrast ratio can be provided.

In FIG. 2, the common electrode 9a is shown like a wiring extending from the scanning line driving circuit 104. However, the common electrode 9a is formed on approximately entire surface of the viewing area 10a of the element substrate 10 and is kept at a predetermined electric potential.

Structure of Each Pixel

Figure 3A:
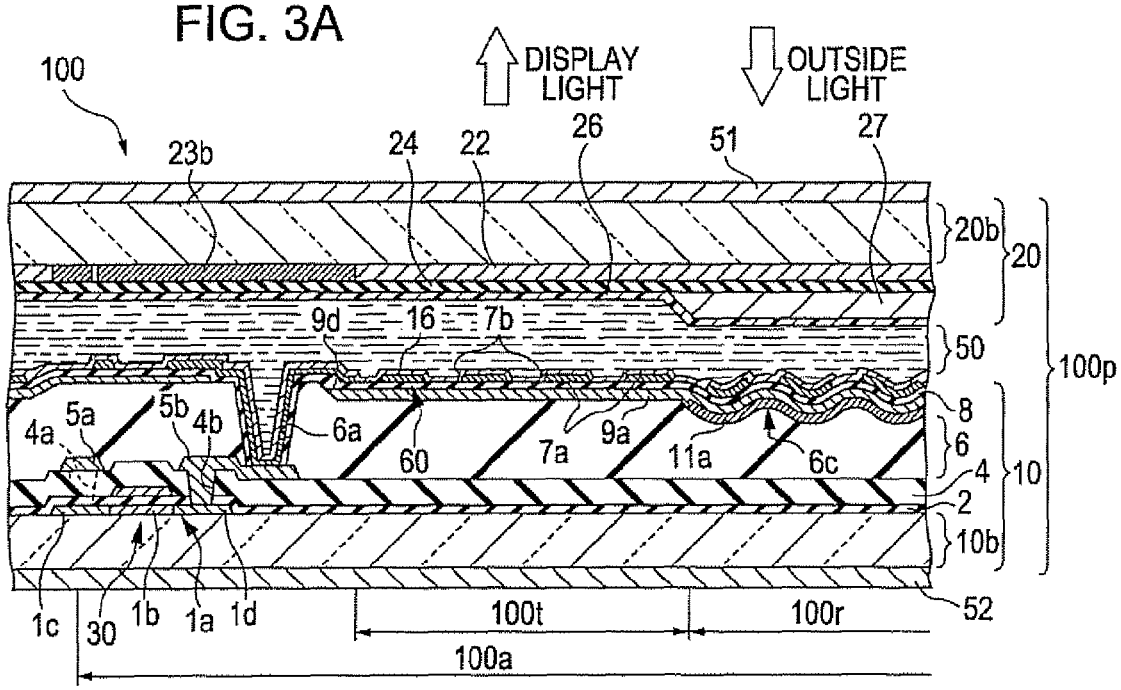
FIG. 3A is a cross sectional view showing one pixel of the liquid crystal display device according to a first embodiment the invention.
Figure 3B:
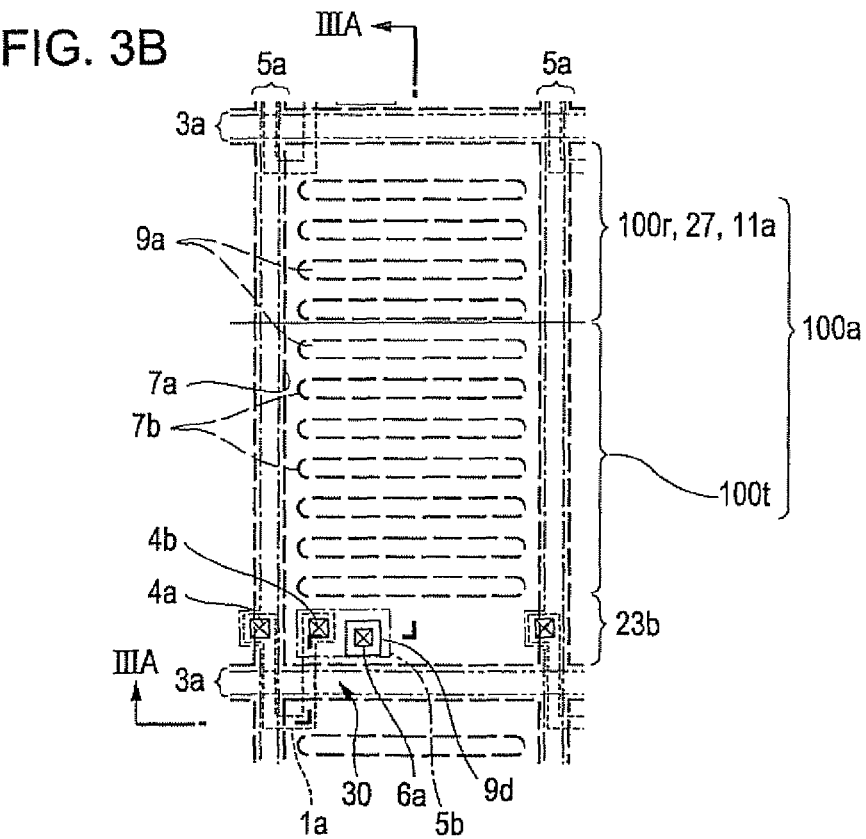
FIG. 3B is a plan view showing a pixel adjacent to each other in an element substrate.

FIG. 3A is a cross sectional view showing one pixel of the liquid crystal display device 100 to which the invention is applied. FIG. 3B is a plan view showing a pixel adjacent to each other in the element substrate 10. FIG. 3A corresponds to the cross sectional view of the liquid crystal display device 100 taken along the line IIIA-IIIA of FIG. 3B. Further, in FIG. 3B, a semiconductor layer 1a is shown by a dotted line, the pixel electrode 7a is shown by a long doted line, the data line 5a and a thin film simultaneously formed therewith is shown by a chain line, the scanning line 3a is shown by a two-dot chain line, and partly removed portions of the common electrode 9a is shown by a solid line.

As shown in FIGS. 3A and 3B, pluralities of the transparent pixel electrodes 7a are formed on the element substrate 10 in a matrix manner for every pixel 10a. The data line 5a and the scanning line 3a electrically connected to the thin film transistor 30 (pixel switching element) are formed in the vertical and horizontal pixel border area of the pixel electrode 7a. Further, the common electrode 9a formed by an ITO film is formed on the approximately entire surface of the viewing area 10 of the element substrate 10. In the embodiment, the common electrode 7a is formed in a solid manner, whereas a plurality of openings 7b each having a slit shape (shown by a long dotted line) is formed in the pixel electrode 7a. In the embodiment, the plurality of openings 7b is extending in the direction parallel to the scanning line 3a.

In FIG. 3A, the base substance of the element substrate 10 is formed by a transparent substrate 10b such as a quartz substrate, a glass substrate having heat resistance, or the like, and the base substance of the counter substrate 20 is formed by a transparent substrate 20b such as a quartz substrate, a glass substrate having heat resistance, or the like. In the embodiment, a glass substrate is used for both of the transparent substrates 10b, 20b.

In FIGS. 3A, 3B, in the element substrate 10, a substrate protective film (not shown) made of a silicon oxide film or the like is formed on the surface of the transparent substrate 10b, and the thin film transistor 30 having a top gate structure is formed at the position adjacent to each pixel electrode 7a at the surface side of the substrate protective film. The thin firm transistor 30 has a structure in which a channel forming area 1b, a source area 1c, and a drain area 1d are formed with respect to the semiconductor film 1a having an island shape. The thin film transistor 30 may be formed to have a LDD (Lightly doped drain) structure equipped with a low concentration area at the both side of the channel forming area 1b. In the embodiment, the semiconductor film 1a is a polycrystalline polysilicon film formed by subjecting to a laser annealing treatment or a lamp annealing treatment after an amorphous silicon film is formed to the element substrate 10.

A gate insulating film 2 formed by a silicon oxide film, a silicon nitride film, or a laminated film thereof is formed on the upper layer of the semiconductor film 1a, and a part of the scanning line 3a is overlapped with the upper layer of the gate insulating film 2 as gate electrodes. In the embodiment, the semiconductor film 1a is bent in a U character shape and has a twin gate structure in which the gate electrodes are formed at two portions in the channel direction.

An interlayer insulating film 4 formed by a silicon oxide film, a silicon nitride film, or a laminated film thereof is formed on the upper layer of the gate electrode (scanning line 3a). The data line 5a is formed on the surface of the interlayer insulating film 4, and the data line 5a is electrically connected to the source area 1c positioned at the most nearest side of the data line 5a via a contact hole 4a formed in the interlayer insulating film 4. Further, a drain electrode 5b is formed on the surface of the interlayer insulating film 4 and the drain electrode 5b is electrically connected to the drain area 1d via a contact hoe 4b formed in the interlayer insulating film 4. The drain electrode 5b is a conducting layer simultaneously formed with the data line 5a.

A resin layer 6 is formed on the upper layer side of the data line 5a and the drain electrode 5b over approximately the entire surface of the viewing area 10a of the element substrate 10, and the resin layer 6 is formed by a light-sensitive resin such as, for example, a thick acrylate resin whose thickness is 1.5 to 2.0 μm.

The common electrode 9a as a lower side electrode layer is formed by a solid ITO film over the entire surface of the resin layer 6. An interelectrode insulating film 8 is formed on the surface of the common electrode 9a. In the embodiment, the interelectrode insulating film 8 is formed by a silicon oxide film or a silicon nitride film whose film thickness is not more than 400 nm. The pixel electrode 7a as an upper side electrode layer is formed by an ITO film on the upper layer of the interelectrode insulating film 8. The openings 7b having the above described slit shape are formed in the pixel electrode 7a. An alignment layer 16 is formed at the surface side of the pixel electrode 7a. The alignment layer 16 is a polyimide resin film which is subjected to alignment treatment by a rubbing method. The alignment layer 16 makes a part of the liquid crystal layer 50 near the alignment layer 16 to align in accordance with the rubbing direction.

In the state where the pixel is structured in this manner, the common electrode 9a and the pixel electrode 7a are opposed via the interelectrode insulating film 8, and a retentive capacity 60 in which the interelectrode insulating film 8 shall be a dielectric film is formed. In the embodiment, the pixel electrode 7a is electrically connected to a drain electrode 6b via the contact hole 6a formed in the resin layer 6. Consequently, a cutout 9d having a rectangular shape is formed at the portion at which the contact hole 6a is formed in the common electrode 9a. In the element substrate 10 formed in this manner, liquid crystal layer 50 is driven at the openings 7b having a slit shape and it surrounding area by a horizontal electric field formed between the pixel electrode 7a and the common electrode 9a.

In the counter substrate 20, a light shielding layer 23b is formed so as to oppose the thin film transistor 30 on the inner surface of the transparent substrate 20b (surface at which the liquid crystal layer 50 is positioned). Further, a color filter 22 of each color is formed in the area surrounded by the light shielding layer 23b. The light shielding layer 23b and the color filter 22 are covered by an insulating protect film 24. An alignment layer 26 is formed at the surface side of the insulating protect film 24. The alignment layer 26 is a polyimide resin film subjected to an alignment treatment by a rubbing method. The alignment layer 26 makes a part of the liquid crystal layer 50 near the alignment layer 26 to align in accordance with the rubbing direction.

Further, a columnar projection (not shown) formed by a photosensitive resin is formed on the element substrate 10 between the element substrate 10 and the counter substrate 20. The distance between the element substrate 10 and the counter substrate 20 is set to a predetermined value by the columnar projection.

Detailed Structure of Each Pixel

The liquid crystal display device 100 of the embodiment is a transflective type, and each of the plurality of pixels 100a is equipped with a transmissive area 100t in which an image is displayed by a transmissive mode and a reflective area 100s by which an image is displayed by a reflective mode. Herein, the resin layer 6 is made of a photosensitive resin equipped with an irregularity 6c in the area corresponding to the reflective area 100r, and the resin layer 6 plays a function as a planarized film with respect to the area in which the transmissive area 100t, the thin film transistor 30, and the like are formed.

The irregularity 6c of the resin layer 6 can be formed by flowing a photosensitive resin when heating the photosensitive resin after the photosensitive resin is subjected to half exposure and is developed. Further, the resin layer 6 equipped with the irregularity 6c can also be formed by applying a photosensitive layer on the upper layer side of the photosensitive resin which is subjected to exposure and is developed so as to correspond to the irregularity 6c.

A light reflecting layer 11a made of aluminum, silver, a mixed metal formed therefrom, or the like is formed on the upper layer of the resin layer 6 in the reflective area 100r. The common electrode 9a, the interelectrode insulating film 8, and the pixel electrode 7a are formed at the upper layer side of the light reflecting layer 11a. Herein, the irregularity 6c of the resin layer 6 is reflected to the light reflecting layer 11a, and optical scatter property is provided thereby.

In the liquid crystal display device 100 structured in this manner, the back light emitted from a back light device (not shown) is optically modulated by the liquid crystal layer 50 during the back light is transmitted through the transmissive area 100t and emitted from the side of the counter substrate 20 as transmissive display light. Further, the outside light introduced in the reflective area 100r from the side of the counter substrate 20 is optically modulated by the liquid crystal layer 50 during the outside light is reflected at the light reflecting layer 11a and emitted from the side of the counter substrate 20 as reflective display light. Accordingly, the length of the pathway through which light proceeds is different in the transmissive mode and the reflective mode.

Consequently, a retardation layer 27 made of liquid crystal polymer is formed on the inner surface of the counter substrate 20 (the surface side at which the liquid crystal layer 50 is positioned) in the area corresponding to the reflective area 100r, and the alignment layer 26 is formed on the surface side of the retardation layer 27. Consequently, the retardation values of the both transmissive mode and reflective mode can be adjusted even when the length of the pathway through which light passes is different in the transmissive mode and the reflective mode. Note that, when regulating the direction of the slow axis of the retardation layer 27, although omitted in the drawings, an alignment layer may be formed as a substrate of the retardation layer 27 to set the slow axis direction of the retardation layer 27 by the alignment layer.

Basic Structure of Optical Property

Figure 4A:
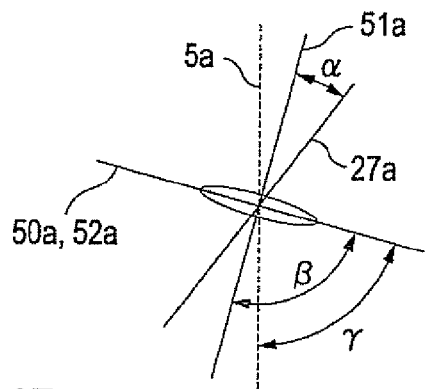
FIGS. 4A to 4D are each a diagram illustrating axes configuration in a reflective area of the liquid crystal display device to which the invention is applied.
Figure 4B:
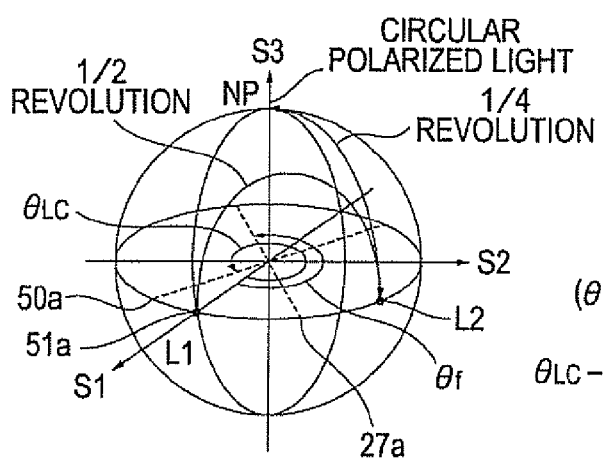
Figure 4C:
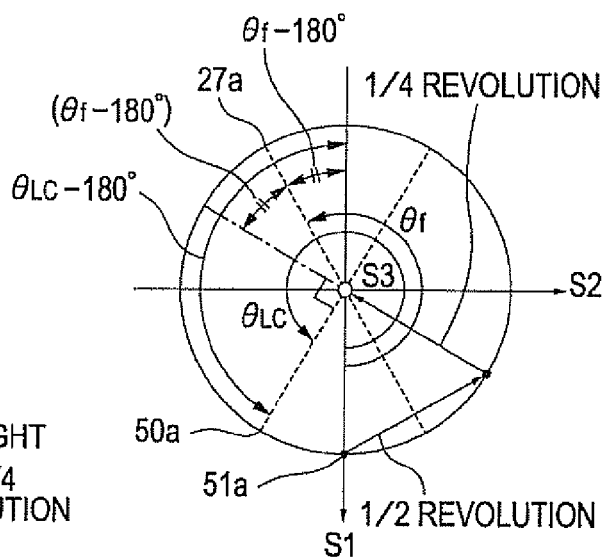
Figure 4D:
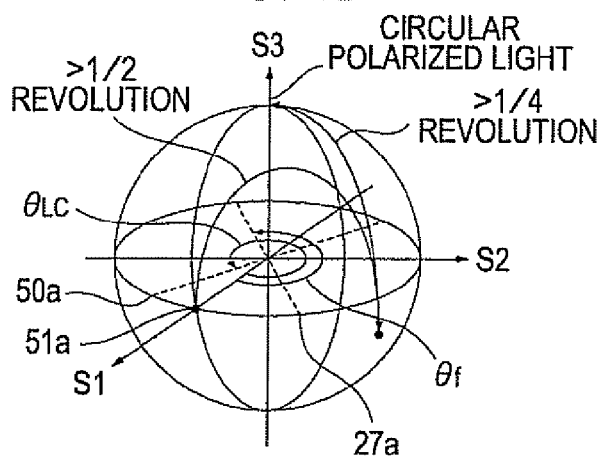

FIGS. 4A to 4D are diagrams showing axes arrangement in the reflective area of the liquid crystal display device to which the invention is applied. FIG. 4A is a diagram showing axes arrangement of the liquid crystal display device to which the invention is applied in a planar manner, FIG. 4B is a diagram showing polarization conversion operation of the retardation film and the liquid crystal layer in the reflective area of the liquid crystal display device by displaying with a Poincare sphere, FIG. 4C is a diagram illustrating planar axes arrangement viewed from S3 axis of FIG. 4B, and FIG. 4D is a diagram showing polarization conversion operation of the retardation film and the liquid crystal layer in the reflective area of the liquid crystal display device to which the invention is applied by displaying with a Poincare sphere.

In the liquid crystal display device 100 of the embodiment, in the following description, an example is shown in which both of the alignment layers 16, 26 are subjected to rubbing treatment in the direction making an angle of 15° with respect to the data line 5a, the element substrate 10 and the counter substrate 20 are bonded together by the seal material 107, and then the liquid crystal 50 is filled.

When the transmissive area 100t of the liquid crystal display device 100 of the embodiment is observed from the normal direction, the axis arrangements are expressed as shown in FIG. 4A. That is, a polarization axis 51a of a first polarizer 51 and a polarization axis 52a of a second polarizer 52 are perpendicular to each other, and the alignment direction of the liquid crystal layer 50 is perpendicular to the polarization axis 51a of the first polarizer 51 and is parallel to the polarization axis 52a of the second polarizer 52.

Further, when the reflective area 100r is observed from the normal direction, the retardation layer 27 is disposed. Herein, as the openings 7b having a slit shape of the pixel electrode 7a extends in the direction perpendicular to the data line 5a, the electric field direction becomes parallel to the data line 5a. In such an axis arrangement, when the azimuthal angle is defined anticlockwise, the alignment direction of the liquid crystal layer 50 is inclined by γ=−75° with respect to the electric field direction, so that a threshold value voltage can be reduced. Further, from the reason described below, a slow axis 27a of the retardation layer 27 makes 22.5° or 67.5° to the polarization axis 51a of the first polarizer 51, and the polarization axis 51a of the first polarizer 51 makes 90° to the alignment direction 50a of the liquid crystal layer 50.

Hereinafter, the azimuthal angle of the slow axis 27a of the retardation layer 27 and retardation values of the retardation layer 27 and the liquid crystal layer 50 will be described.

The following formula for regulating the azimuthal angle of the slow axis 27a of the retardation layer 27

$\beta = \alpha \times 2 \pm 45°$

α: the angle between the polarization axis 51a of the first polarizer 51 and the slow axis 27a of the retardation layer 27

β: the angle between the polarization axis 51a of the first polarizer 51 and the alignment direction 50a of the liquid crystal layer 50, and the retardation values of the retardation layer 27 and the liquid crystal layer 50 are obtained as described below by using the Poincare sphere display shown in FIG. 4B and the axes display shown in FIG. 4C.

The Poincare sphere display shown in FIG. 4B is well-known in the art of optics, so that the detail description is omitted. The Poincare sphere display is defined in the space in which Stokes parameters (S1, S2, S3) indicating the polarization state are set to three axes. An intersection line (equator) with an (S1, S2) plane on the Poincare sphere corresponds to the linearly polarized light. Crossing points (north pole and south pole) with the S3 axis correspond to the circular polarized light. Others correspond to the elliptically polarized light. Herein, a conversion of polarization state by the retardation layer 27 and the liquid crystal layer 50 without twist is expressed as a rotation around a line which is included in the (S1, S2) plane on the Poincare sphere and passes through the center of the Poincare sphere. A rotational angle at this time is equal to ½ rotation if the retardation value of the retardation film is equal to a half wavelength and to ¼ rotation if it is equal to a quarter wavelength.

Accordingly, if the retardation value of the liquid crystal layer 50 in the reflective area 100r is set to a quarter wavelength, and the retardation value of the retardation layer 27 is set to a half wavelength, the incident light L1 converted into linearly polarized light by the first polarizer 51 is located on the equator on the Poincare sphere. However, the light is moved to another one point L2 on the equator by rotating ½ revolution around the rotation axis of the azimuthal angle θf by the retardation layer 27, and converted into linearly polarized light having a different vibration direction. Subsequently, the light is rotated by ¼ revolution around the rotation axis of the azimuthal angle θL by the liquid crystal layer 50, moved to the north pole NP, and converted into a circularly polarized light. Accordingly, in the reflective area 100r, the incident light is polarized into circularly polarized light or polarized state similar to the circularly polarized light and introduced into the light reflecting layer 11a. Then, the light is reflected by the light reflecting layer 11a and polarized to linearly polarized light perpendicular to the polarization axis 51a of the first polarizer 51, that is, linear polarized light parallel to the absorption axis of the first polarizer 51 when introduced again into the first polarizer 51. Accordingly, achromatic dark display can be obtained. Note that the retardation value of the liquid crystal layer 50 and the retardation value of the retardation layer 27 are set based on the light whose wavelength is 550 nm at which the luminosity factor of human beings becomes the maximum among visible light.

Next, in order to explain the relationship of the rotation axis of the azimuthal angle θf by the retardation layer 27 and the rotation axis of the azimuthal angle θL by the liquid crystal layer 50, a description will be made with reference to FIG. 4C in which FIG. 4B is viewed from S3 axis direction.

In FIG. 4c, the extended line of the direction in which the introduced light is rotated by ¼ revolution is shown by the chain line, and the extended line in the ¼ revolution direction is perpendicular to the alignment direction 50a (azimuthal angle θLc) of the liquid crystal layer 50 indicative of the center of the revolution. Further, the direction of the slow axis 27a (azimuthal angle θf) of the retardation layer 27 indicative of the center of the ½ revolution divides an angle between S1 axis and the extended line in ¼ revolution direction into two equal angles. The angle obtained by dividing the angle between S1 axis and the extended line in ¼ revolution direction into the two equal angles is equal to (θf−180°). Since (θLc−180°) is equal to ((θf−180°)×2+90°), the following formula is obtained.

$$2\theta f = \theta Lc + 90°$$

Herein, the rotation axes on the Poincare sphere correspond to the angle α between the polarization axis 51a of the first polarizer 51 and the slow axis 27a of the retardation layer 27 and the angle β between the polarization axis 51a of the first polarizer 51 and the alignment direction 50a of the liquid crystal layer 50, so that the azimuthal angles 2θf, θLc of the rotation axes are as described below.

$$\theta f = 2 \times \alpha$$

$$\theta Lc = 2 \times \beta$$

Accordingly, the formula described below is obtained.

$$\beta = \alpha \times 2 - 45°$$

The incident light of each wavelength is concentrated at the north pole NP of the Poincare sphere in the above example. However, even when the incident light of each wavelength is concentrated at the south pole SP of the Poincare sphere, the similar effect can be obtained. In this case, the relationship between α and β is expressed by the following formula.

$$\beta = \alpha \times 2 + 45°$$

Further, as the angle β between the polarization axis 51a of the first polarizer 51 and the alignment direction 50a of the liquid crystal layer 50 is set to 90°, the following relation is satisfied.

$$\alpha = 67.5° \text{ or } 22.5°$$

Further, when an allowable range is set to ±10% from various evaluation results, the angle made by the slow axis 27a of the retardation layer 27 and the polarization axis 51a of the first polarizer 51 is set to not less than 20° and not more than 25° or not less than 60° and not more than 75°.

Optimization of Retardation Values of Liquid Crystal Layer 50 and Retardation Layer 27

Figure 5:
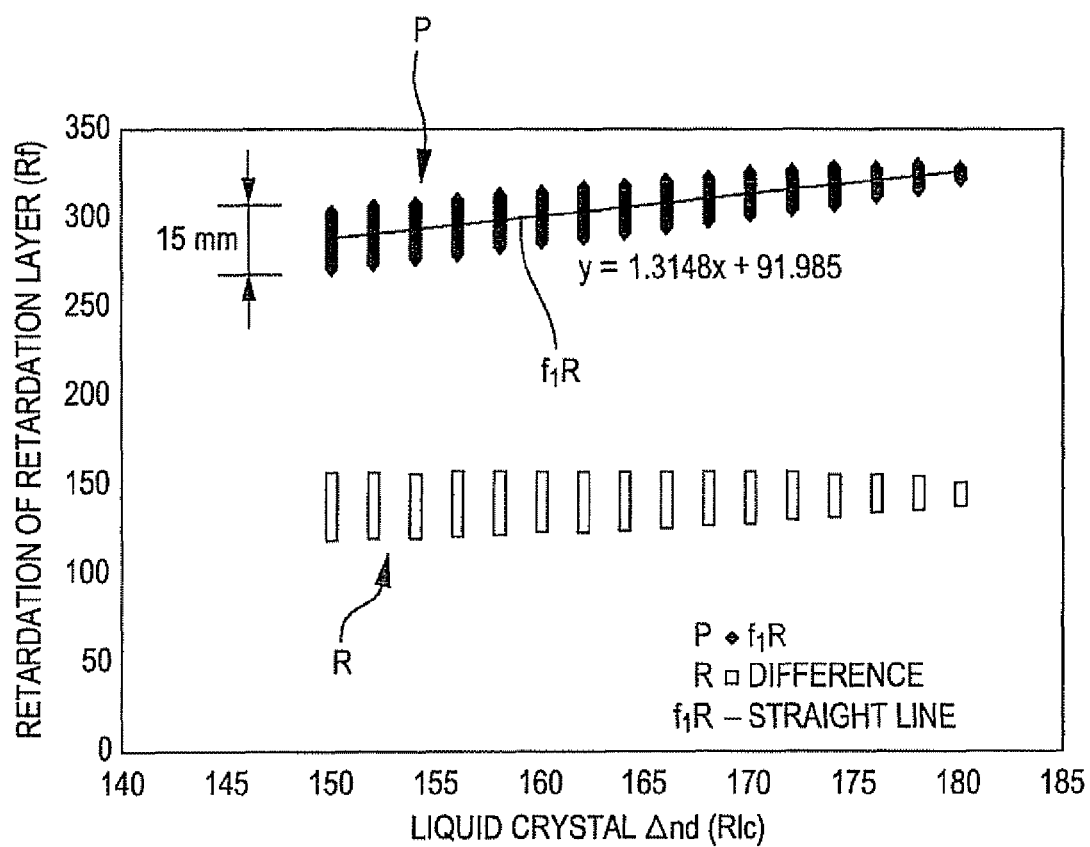
FIG. 5 is a graph showing a result of a range of a retardation value of a retardation layer which satisfies the condition that the output ratio of light (reflectance rate) is less than 1% when a retardation value of a liquid crystal layer is changed which is examined by a simulation in the liquid crystal display device to which the invention is applied.

FIG. 5 is a graph showing a result of a range of the retardation value Rf of the retardation layer 27 which satisfies the condition that the output ratio of light (reflectance rate) is less than 1% when the retardation value RLc (Δnd) of the liquid crystal layer 50 is changed which is examined by a simulation in the liquid crystal display device 100 to which the invention is applied.

In the liquid crystal display device 100, if the retardation value of the liquid crystal layer 50 in the reflective area 100r with respect to the light whose wavelength is 550 nm is set to the quarter wavelength, the retardation value of retardation layer 27 with respect to the light whose wavelength is 550 nm is set to the half wavelength, and the angle α between the polarization axis 51a of the first polarizer 51 and the slow axis 27a of the retardation layer 27, and the angle β between the polarization axis 51a of the first polarizer 51 and the alignment direction 50a of the liquid crystal layer 50 are set to the above described range, achromatic dark display can be obtained in the reflective area 100r when no voltage is applied. However, if the retardation value of the liquid crystal layer in the reflective area is set to the quarter wavelength, when Δn of the liquid crystal layer is about 0.12, the thickness of the liquid crystal layer has to be set to an extremely thin value of about 1.1 μm. As a result, it becomes difficult to provide mass productivity.

Consequently, in the embodiment, in the case where the retardation value RLc (Δnd) of the liquid crystal layer 50 with respect to the light whose wavelength is 550 nm is changed, the range of the retardation value Rf of the retardation layer 27 that satisfies the condition that the output ratio of light is less than 1% is examined by a simulation. As a result, the range shown by the mark P in FIG. 5 is obtained as the range of the retardation value Rf of the retardation layer 27 that satisfies the condition. Note that, in FIG. 5, the difference between the retardation value Rf of the retardation layer 27 in the range shown by the marks P and the retardation value RLc of the liquid crystal layer 50 is shown by the mark R, and a linear first order approximation of the range shown by the mark P is shown by the straight line f1R.

As shown in FIG. 5, even when the retardation value RLc of the liquid crystal layer 50 with respect to the light whose wavelength is 550 nm exceeds the quarter wavelength (138 nm), when the retardation value Rf of the retardation layer 27 exceeds the half wavelength (275 nm), the condition in which output ratio of light is less than 1% can be provided.

That is, in the Poincare sphere display shown in FIG. 4D, if the retardation value Rf of the retardation layer 27 exceeds the half wavelength, output ratio of light does not become ½ revolution in the rotation by the retardation layer 27 and the light is moved to the point apart from the equator. However, since the retardation value RLc of the liquid crystal layer 50 exceeds the quarter wavelength, the moving direction becomes approximately the opposite direction by the rotation in the liquid crystal layer 50. Accordingly, a difference of the rotation angle by the wavelength caused in the retardation layer 27 is compensated. Accordingly, the light is concentrated on a position near the north pole and become almost the circular polarized light, so that achromatic dark display can be obtained.

Based on the examined result, in the embodiment, the range in which the retardation value RLc of the liquid crystal layer 50 exceeds the quarter wavelength (138 nm) and the retardation value Rf of the retardation layer 27 exceeds the half wavelength (275 nm) with respect to the light whose wavelength is 550 nm are set.

Herein, the following approximation formula (see straight line f1R of FIG. 5) is satisfied between the retardation value RLc (nm) of the liquid crystal layer 50 in the reflective area 100r and the retardation value Rf (nm) of the retardation layer 27.

$$Rf=1.3148 \times RLc+91.985$$

In addition, Rf is equipped with a width of about 15 nm. Accordingly, RLc and Rf are set so as to satisfy the following relation.

$$1.3148 \times RLc+91.985-15 \leq Rf \leq 1.3148 \times RLc+91.985+15$$

In this manner, according to the embodiment, the thickness of the liquid crystal layer 50 in the reflective area 100r can be enlarged. The liquid crystal display device 100 can be efficiently produced in large quantities it the thickness of the liquid crystal layer 50 can be enlarged.

Other Embodiments

In the above embodiment, the example is described in which the invention is applied to the liquid crystal display device 100 of an FFS system as a type for utilizing horizontal electric field. However, the invention may be applied to a transflective type liquid crystal display device of an IPS system. In the liquid crystal display device of an IPS system, a comb like pixel electrode connected to a thin film transistor and a comb like common electrode formed so as to straddle a plurality of pixels are formed on a surface of a common insulating layer.

Further, in the above embodiment, the example is employed in which a polysilicon film is used as a semiconductor film. However, the invention may be applied to the element substrate 10 using an amorphous silicon film or a monocrystalline silicon layer. Further, the invention may be applied to a liquid crystal display device using a thin film diode element (nonlinear element) as a pixel switching element.

Install Example of Electronic Apparatus

Figure 6A:
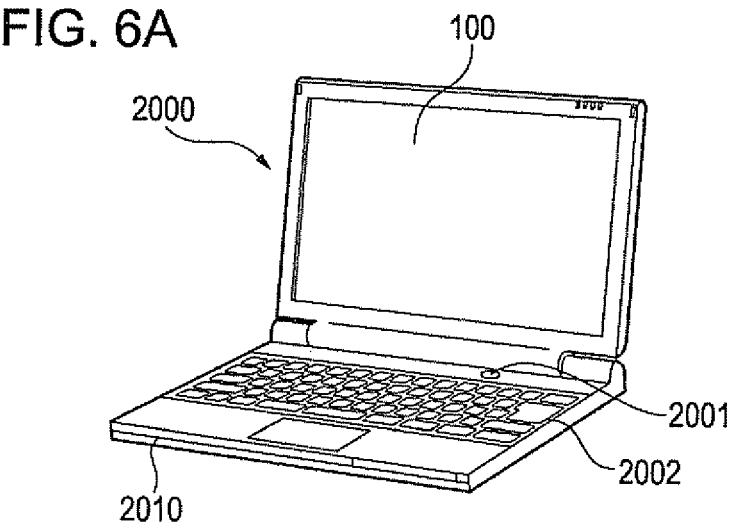
FIGS. 6A to 6C are each a diagram illustrating an electronic apparatus using the liquid crystal display device according to the invention.
Figure 6B:
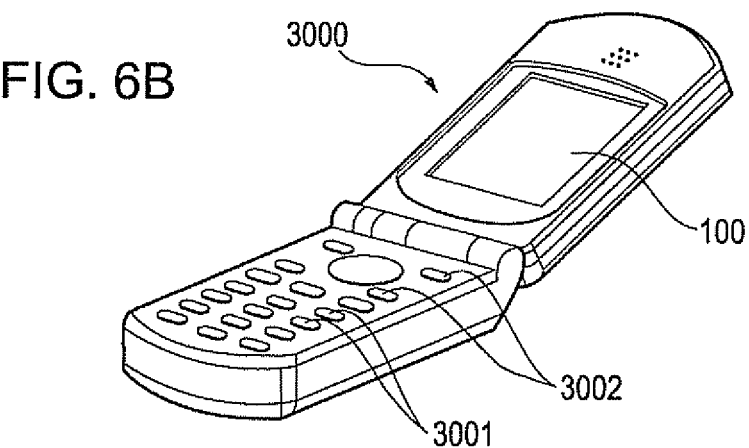
Figure 6C:
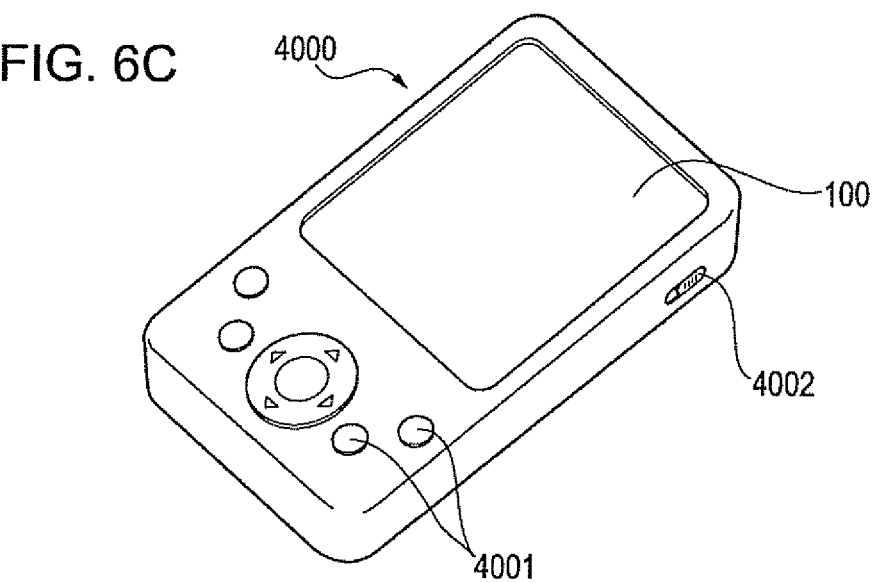

Next, an electronic apparatus to which the liquid crystal display device 100 according to the above described embodiment is applied will be described. The structure of a mobile type personal computer equipped with the liquid crystal display device 100 is shown in FIG. 6A. The personal computer 2000 is equipped with the liquid crystal display device 100 as a display unit and a main body unit 2010. A power source switch 2001 and a key board 2002 are provided in the main body unit 2010. The structure of a mobile phone equipped with the liquid crystal display device 100 is shown in FIG. 6B. The mobile phone 3000 is equipped with a plurality of operation buttons 3001, scroll buttons 3002, and the liquid crystal display device 100 as a display unit. By operating the scroll buttons 3002, the screen displayed on the liquid crystal display device 100 is scrolled. The structure of a personal digital assistant (PDA) to which the liquid crystal display device 100 is applied is shown in FIG. 6C. The personal digital assistant 4000 is equipped with a plurality of operation buttons 4001, a power source switch 4002, and the liquid crystal display device 100 as a display unit. By operating the power source switch 4002, various kinds of information such as an address list, a date book, or the like is displayed on the liquid crystal display device 100.

Note that as for an electronic apparatus to which the liquid crystal display device 100 is applied, besides the apparatuses shown in FIGS. 6A to 6C, there are included a digital still camera, a liquid crystal television, a viewfinder-type or monitor-direct-view type video tape recorder, a car navigation device, a pager, an electronic organizer, a calculator, a word processor, a work station, a videophone, a POS terminal, equipments having a touch panel, and the like. The liquid crystal display device 100 can be applied as a display unit of the various electronic apparatuses.

What is claimed is:

1. A liquid crystal display device comprising:
   a first substrate from which display light is emitted;
   a second substrate bonded together with the first substrate via a seal material;
   a liquid crystal layer homogeneously aligned between the first substrate and the second substrate;
   a pixel electrode provided on the second substrate;
   a common electrode provided on the second substrate, the common electrode applying an electric field to the liquid crystal layer with the pixel electrode;
   a pixel including the pixel electrode and the common electrode, the pixel having a transmissive display area and a reflective display area;
   a first polarizer provided on the first substrate, the first polarizer having a polarization axis parallel to or perpendicular to an initial alignment direction of the liquid crystal layer;
   a second polarizer provided on the second substrate, the second polarizer having a polarization axis perpendicular to the polarization axis of the first polarizer; and
   a retardation layer formed of liquid crystal polymer and formed between the liquid crystal layer and the first polarizer only in the reflective display area, the retardation layer having a slow axis that makes an angle of not less than 20° and not more than 25° or not less than 60° and not more than 75° with respect to the polarization axis of the first polarizer,
   wherein
   a retardation value of the liquid crystal layer in the reflective display area is set to a value that exceeds a quarter wavelength, and a retardation value of the retardation layer is set to a value that exceeds a half wavelength.

2. The liquid crystal display device according to claim 1, wherein
   the retardation layer is formed on a surface of the first substrate at the liquid crystal layer side.

3. The liquid crystal display device according to claim 1, wherein if the retardation value of the liquid crystal layer in the reflective area is RLc (nm) and the retardation value of the retardation layer is Rf (nm), RLc and Rf satisfy the following relation:

$$1.3148 \times RLc+91.985-15 Rf \leq 1.3148 \times RLc+91.985+15.$$

4. An electronic apparatus comprising the liquid crystal display device according to claim 1.

* * * * *